United States Patent [19]
Browning et al.

[11] Patent Number: 5,721,472
[45] Date of Patent: Feb. 24, 1998

[54] IDENTIFYING AND DISABLING SHORTED ELECTRODES IN FIELD EMISSION DISPLAY

[75] Inventors: Jimmy J. Browning, Boise; John K. Lee, Meridian, both of Id.

[73] Assignee: Micron Display Technology, Inc., Boise, Id.

[21] Appl. No.: 584,894

[22] Filed: Jan. 9, 1996

Related U.S. Application Data

[63] Continuation-in-part of Ser. No. 543,739, Oct. 16, 1995, which is a continuation of Ser. No. 307,090, Sep. 16, 1994, Pat. No. 5,459,480, which is a continuation of Ser. No. 89,212, Jul. 8, 1993, abandoned, and a continuation-in-part of Ser. No. 11,927, Feb. 1, 1993, Pat. No. 5,357,172, which is a continuation-in-part of Ser. No. 864,702, Apr. 7, 1992, Pat. No. 5,210,472.

[51] Int. Cl.$^6$ ............................................. G09G 3/10
[52] U.S. Cl. ........................... 315/169.1; 315/169.3; 315/349; 345/74
[58] Field of Search ......................... 315/169.1, 169.3, 315/169.4, 349; 313/309, 336; 345/74, 75

[56] References Cited

U.S. PATENT DOCUMENTS

| | | | |
|---|---|---|---|
| 4,780,684 | 10/1988 | Kosmahl | 313/309 |
| 4,874,981 | 10/1989 | Spindt | 313/309 |
| 4,908,539 | 3/1990 | Meyer | 315/169.3 |
| 4,983,878 | 1/1991 | Lee et al. | 313/308 |
| 5,194,780 | 3/1993 | Meyer | 315/169.3 |
| 5,210,472 | 5/1993 | Casper et al. | 315/349 |
| 5,329,237 | 7/1994 | Horch | 324/501 |
| 5,387,844 | 2/1995 | Browning | 315/169.3 |

*Primary Examiner*—Robert Pascal
*Assistant Examiner*—David Vu
*Attorney, Agent, or Firm*—Robert J. Stern

[57] ABSTRACT

Methods and apparatus for identifying and disabling shorted electrode pair (such as field emitter tip electrodes shorted to grid electrodes) in a field emission display by applying a test voltage across the two electrodes in each pair. The magnitude of the test voltage is set below the voltage required to initiate field emission from the emitter tip electrode. Because no field emission occurs at this voltage, the test voltage should produce no current flow through good (non-shorted) emitter tips. However, current will flow through emitter tips which are shorted to their respective grid electrodes. In one embodiment, the current flow vaporizes the bad emitter tips themselves. In another embodiment, the current flow thermally damages a removable link connected in series with either the shorted emitter tip or the shorted grid electrode. Alternatively, rather than disabling the shorted electrodes, the method of the invention can be used to merely identify shorted electrodes by sensing which electrodes conduct current in response to the test voltage. In one embodiment, the test voltage is applied, preferably simultaneously, to all the electrode pairs in the display, causing a current flow through any shorted electrodes which is high enough to produce resistive heating which can be sensed to locate the shorted electrodes. In another embodiment, the test voltage is applied sequentially to small subsets of the electrode pairs while measuring the resulting current flow. The display can be fabricated with multiple power supply busses to facilitate applying the test voltage to selected subsets of electrode pairs.

24 Claims, 5 Drawing Sheets

IDENTIFYING AND DISABLING SHORTED ELECTRODES IN FIELD EMISSION DISPLAY

CROSS REFERENCE TO RELATED APPLICATIONS

This patent application is a continuation-in-part of copending application Ser. No. 08/543,739 filed Oct. 16, 1995 entitled "Architecture for Isolating Display Grid Sections in a Field Emission Display"; which is a continuation of application Ser. No. 08/307,090 filed Sep. 16, 1994, now U.S. Pat. No. 5,459,480; which is a continuation of application Ser. No. 08/089,212 filed Jul. 8, 1993, now abandoned, and a continuation-in-part of application Ser. No. 08/011,927 filed Feb. 1, 1993, now U.S. Pat. No. 5,357,172; which is a continuation-in-part of application Ser. No. 07/864,702 filed Apr. 7, 1992, now U.S. Pat. No. 5,210,472.

FIELD OF THE INVENTION

The invention relates to field emission displays. More specifically, it relates to methods and apparatus for disabling sections of a field emission display which are defective.

BACKGROUND OF THE INVENTION

Field emission displays have an array of hundreds of thousands of sharply pointed emitter tip electrodes, generally arranged in a plane, and an array of grid electrodes, generally arranged in a plane parallel to the plane of emitter tips. A small gap is maintained between each emitter tip and the nearest grid electrode. When a sufficient positive voltage is applied to the grid electrodes relative to the emitter tips, field emission of electrons from the emitter tips occurs, so that electrons flow from the emitter tips toward the grid. Typically, the grid is perforated so that almost all the electrons pass through the perforations and strike a cathodoluminescent coating on an anode electrode connected to a much higher positive voltage, which consequently emits light.

The emitter tips generally are organized as a matrix of pixels, with a pixel being the smallest area of the display whose illuminance is separately controlled in response to a video signal. Typically, many emitter tips are provided for each pixel to achieve adequate current flow, hence adequate display brightness.

All the emitter tips in any one pixel typically are connected together and controlled by a pixel control circuit in response to the video input signal. In an active matrix display each pixel has its own pixel control circuit. In a passive matrix display, a single pixel control circuit may control an entire row or column of pixels.

During manufacture of a field emission display, an electrical short circuit can be created inadvertently between an emitter tip and its associated grid electrode. Such short circuits may be caused by defects in the dielectric layer separating the grid from the emitter tip, or may be caused by a particulate contaminant creating a conductive bridge between the emitter tip and grid.

A single short-circuited emitter tip can render inactive (i.e., dark) the entire pixel containing the emitter tip, because the voltage across the shorted emitter tip and grid will be close to zero, thereby reducing close to zero the voltage across the remaining good electrode paths in that pixel. As a result, the voltage across the good electrode pairs will be much too low to initiate field emission. Consequently, no current will flow through the good emitter tips, and all the current supplied by the pixel control circuit will flow through the shorted electrode pair.

Therefore, one bad emitter tip in the pixel can disable field emission from the other, good emitter tips in the pixel, causing the entire pixel to be dark.

Accordingly, there is a need to preserve the operability of a display even if one or more shorts exist between certain emitter tips and their corresponding grid electrodes.

SUMMARY OF THE INVENTION

The present invention encompasses methods and apparatus for identifying and disabling shorted electrode pairs (such as field emitter tip electrodes shorted to their corresponding grid electrodes) in a field emission display. Disabling the shorted electrodes permits other good electrodes to continue functioning so that the display remains usable. In preferred embodiments, the invention permits disabling shorted electrodes within a pixel while allowing other electrodes within that pixel to continue functioning, so that the display need not lose any operational pixels even if a limited number of electrodes are disabled.

More specifically, the method of the invention comprises identifying and/or disabling shorted pairs of electrodes by applying a test voltage across the two electrodes in each pair. The magnitude of the test voltage is set below the voltage required to initiate field emission from the emitter tip electrode. Because no field emission occurs at this voltage, the test voltage should produce no current flow through good (non-shorted) emitter tips. However, current will flow through emitter tips which are shorted to their respective grid electrodes.

The method of the invention can be used to disable shorted electrodes if the test voltage produces a current flow high enough to thermally damage a portion of the current flow path, thereby producing an open circuit which prevents further current flow to the shorted emitter tips. In one embodiment, the current flow vaporizes the bad emitter tips themselves. In another embodiment, the current flow thermally damages a fuse or other removable link connected in series with either the shorted emitter tip or the shorted grid electrode.

To facilitate thermal destruction of the shorted emitter tips or the fusible links, the test voltage can be higher if its polarity is the opposite that of the grid voltage normally applied during operation of the display. In other words, a negative test voltage is applied to the grid electrodes relative to the emitter tips. Additionally, to further increase the current flow for destroying shorted emitter tips or fusible links, each of the emitter tips preferably is fabricated within an N-type semiconductor region which adjoins a P-type semiconductor substrate at a PN junction boundary. The test voltage forward biases the PN junction of each shorted emitter tip, thereby providing a low impedance path enabling increased current flow.

Alternatively, rather than disabling the shorted electrodes, the method of the invention can be used to merely identify shorted electrodes. The identification is accomplished by sensing which electrodes conduct current in response to the test voltage. In one embodiment, the test voltage is applied, preferably simultaneously, to all the electrode pairs in the display, causing a current flow through any shorted electrodes which is high enough to produce resistive heating which can be sensed to locate the shorted electrodes. In another embodiment, the test voltage is applied sequentially to small subsets of the electrode pairs while measuring the resulting current flow. All the electrodes in a subset are identified as good (non-shorted) if no current flows in response to the test voltage. Conversely, if current flow is detected, the subset is identified as including at least one shorted electrode pair.

In the identifying method, each subset of electrodes preferably is connected in series with a removable link. After the bad subsets of electrodes are identified as described in the preceding paragraph, those electrodes can be disabled by removing their corresponding links by such means as vaporizing the links with a laser beam.

In the identifying method, the display more preferably has a plurality of pixels, and each pixel has a plurality of emitter tips and grid electrode pairs. The electrode pairs in each pixel are divided into N subsets, where N≧2. A video control circuit connects to the emitter tips in each pixel to control the current flow in response to a video signal. A test voltage source selectably connects to N bus conductors. In each pixel, for each integer k from 1 to N, a removable link connects the k-th subset of grid electrodes to the k-th bus conductor. Subsets containing short-circuited electrodes are identified by connecting the test voltage source to only selected ones of the N bus conductors while activating the video control circuit for only selected pixels. Different combinations of busses and pixels are activated according to a sifting sequence. The k-th subset of electrodes in a pixel is identified as either good or bad (i.e., as containing a shorted electrode) according to whether current flow is measured when that pixel is activated while the test voltage source is connected to the k-th bus. If the k-th subset of a pixel is identified as bad, then the k-th removable link of that pixel is removed.

In an apparatus aspect, the invention is a field emission display having removable links as defined above. In one apparatus embodiment, the display further comprises N busses as defined above.

DETAILED DESCRIPTION OF THE PREFERRED EMBODIMENTS

1. Conventional Field Emission Display

Figure 1:
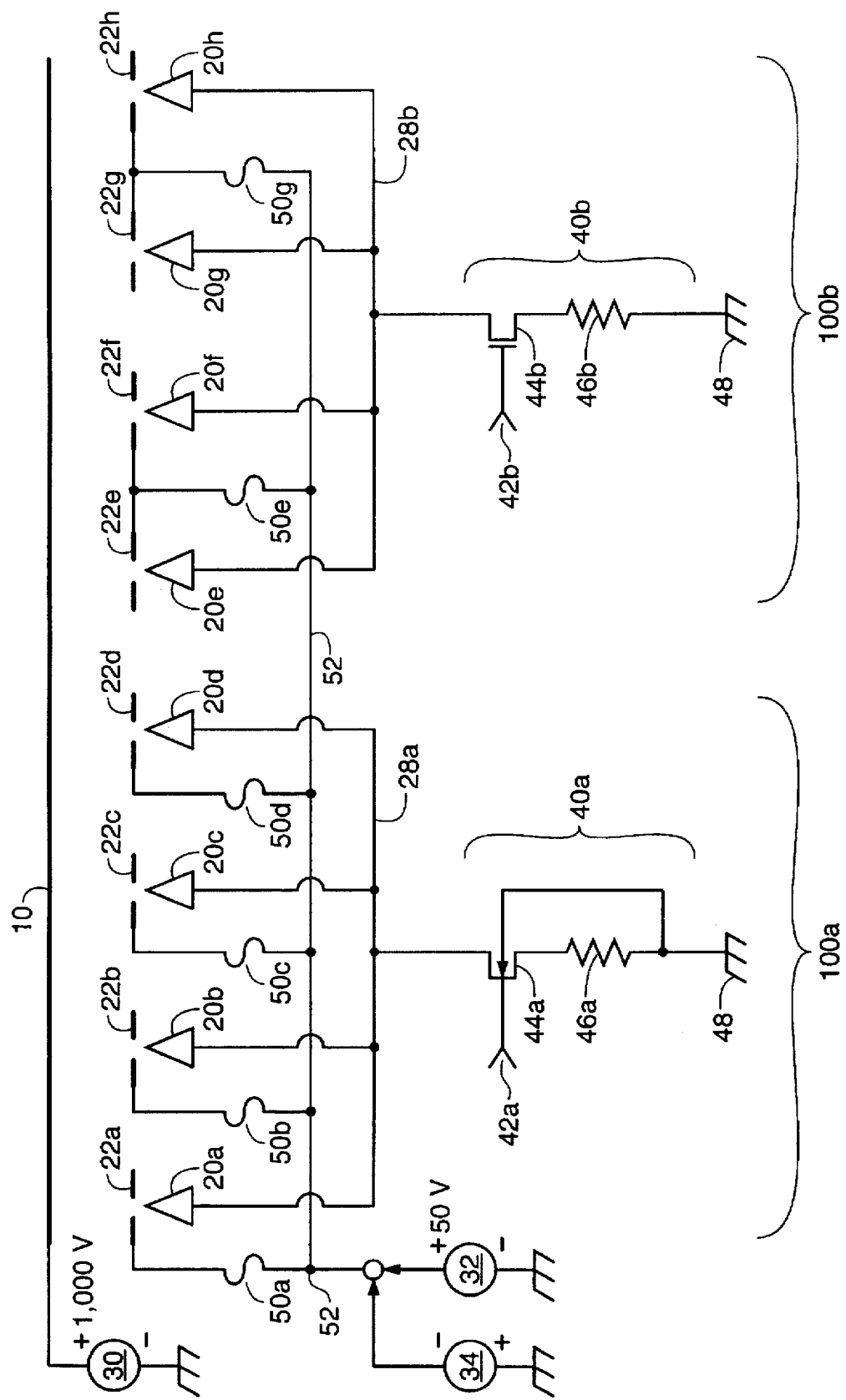
FIG. 1 is an electrical schematic diagram of two pixels of a field emitter display.
Figure 2:
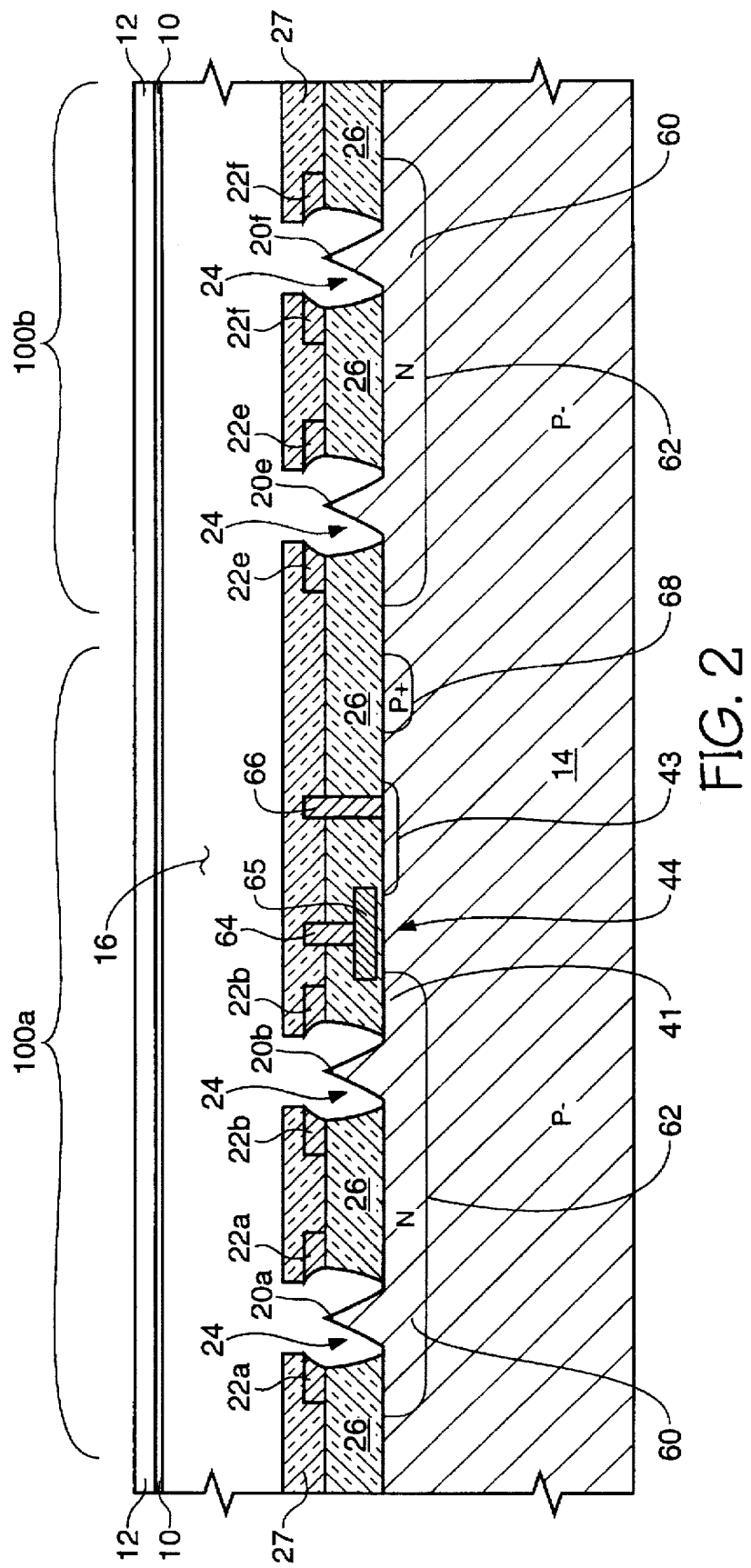
FIG. 2 is a sectional view of two pixels of the display of FIG. 1.
Figure 3:
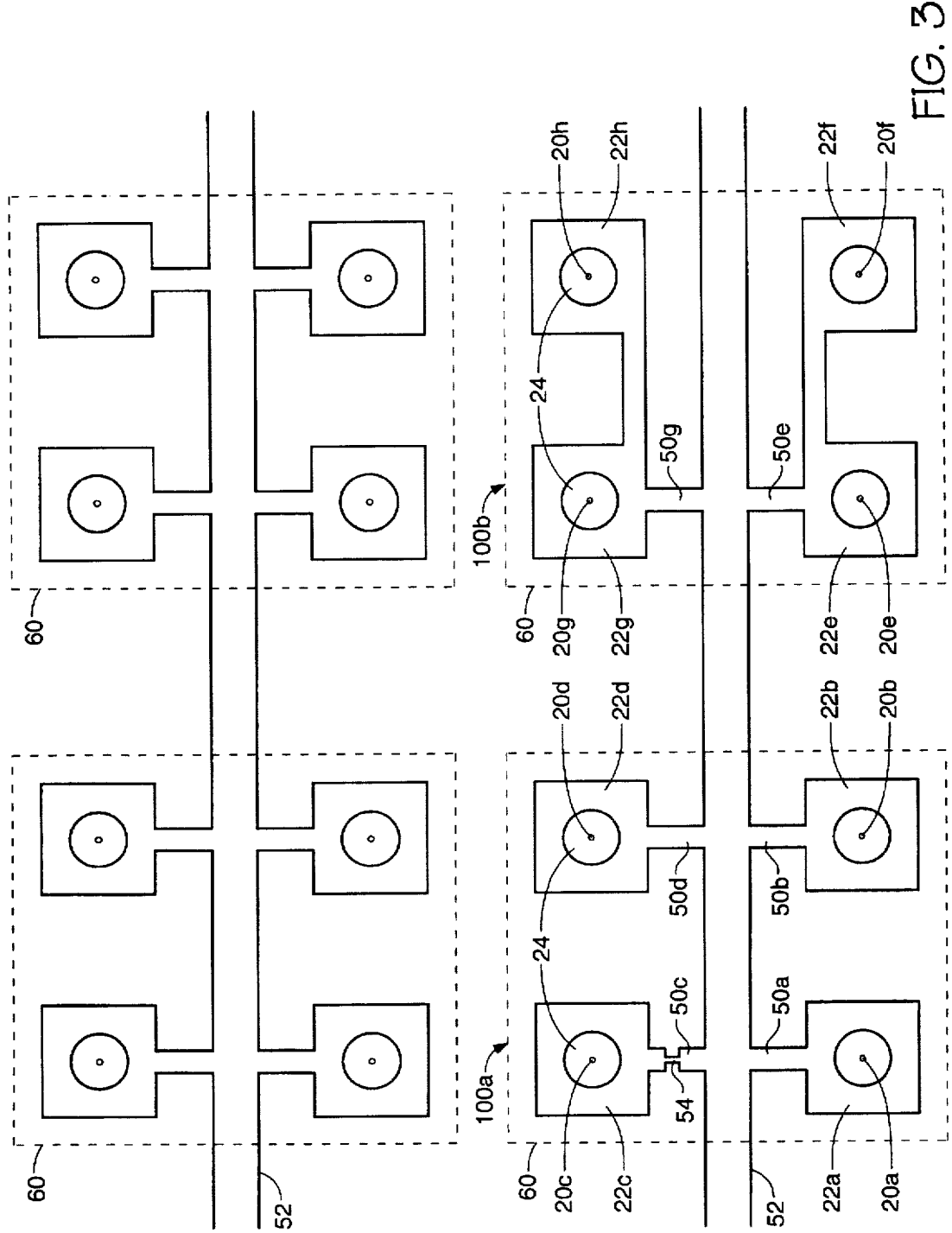
FIG. 3 is a top view of the grid electrodes of the display of FIG. 1, with the N-doped isolation wells outlined in phantom.

FIGS. 1-3 illustrate two pixels 100a and 100b of an exemplary field emission display suitable for use with the invention. A complete display typically has at least hundreds of thousands of such pixels arranged in a rectangular matrix. Although novel features of the present invention are shown in FIGS. 1-3, the conventional features will be described first.

As in a conventional field emission display, our display has an anode 10 composed of a electrically conductive, optically transparent film (such as indium tin oxide) which is deposited on a rigid, transparent top plate 12, typically made of glass. A cathodoluminescent phosphor (not shown) is deposited on the surface of the anode. A substrate 14, preferably silicon, is mounted on the top plate 12 by spacers (not shown) which maintain the substrate a fixed, uniform distance from the top plate, typically about 250 microns. The structure has a vacuum-tight seal at its perimeter, and a vacuum is maintained in the gap between the silicon substrate 14 and the top plate 12.

A large number of emitter tip electrodes 20, typically hundreds of thousands, are fabricated on the surface of the silicon substrate 14 facing the anode (hereinafter referred to as the substrate surface). Each field emitter tip electrode is surrounded by a grid electrode or gate electrode 22 composed of an electrically conductive material, such as aluminum or doped polysilicon. Each grid electrode 22 has an opening or aperture 24 surrounding or aligned with each corresponding emitter tip 20, so as to leave an unobstructed path between the emitter tip and the anode 10.

In this patent specification, the term "electrode pair" means an emitter tip electrode and its corresponding grid electrode, i.e., the grid electrode whose aperture adjoins that emitter tip. A single grid electrode can have multiple apertures respectively aligned with multiple emitter tips, in which case that single grid electrode would be the "corresponding" grid electrode for each of the multiple emitter tips. In fact, it is conceivable, although not desirable, for multiple emitter tips to be aligned with a single aperture in a grid electrode.

An anode voltage power supply 30 supplies a high, positive voltage, typically +1000 volts, to the anode 10, and a grid voltage power supply 32 supplies a much lower positive voltage, typically +50 volts, to each grid electrode 22.

A pixel 100 is the smallest area of the display whose brightness or luminance is independently controlled in response to a video input signal 42. Each pixel 100 includes a number of emitter tips 20 which are controlled together by a pixel control circuit 40. In response to the video input signal, the pixel control circuit 40 controls the current flow from a relatively negative voltage node 48 (electrical ground in the illustrated embodiment) to the emitter tips in that pixel.

In an active matrix display such as shown in FIGS. 1 and 2, each pixel 100 has its own pixel control circuit 40. The pixel control circuit (e.g., 40a) for each individual pixel (e.g., 100a) controls all the emitter tips (e.g., 20a-20d) belonging to that pixel. Alternatively, in a passive matrix display, one pixel control circuit may control an entire row or column of pixels.

For purposes of illustration, FIGS. 1-3 show each pixel as including four emitter tips. Because each emitter tip can only conduct a limited amount of current without risk of damage, field emission displays conventionally include many emitter tips per pixel to increase the brightness capability of each pixel. The emitter tips 20 and control circuit 40 are replicated at each of the thousands of pixels in the display.

In the operation of an individual pixel 100a, when the voltage of that pixel's video input signal 42a is zero, indicating that the pixel 100a is to be dark, that pixel's control circuit 40a increases its impedance so as to raise the voltage at that pixel's emitter tips 20a–20d to a value close to the grid voltage. Conversely, when the voltage of the video input signal 42a is high, indicating that the pixel 100a is to emit light, the control circuit 40a reduces the voltage at the emitter tips 20a–20d to a value much less than the grid voltage, so that the voltage drop between the grid electrodes 22a–22d and the corresponding emitter tips 20a–20d is sufficient to cause field emission of electrons from each emitter tip. The much higher positive voltage on the anode 10 accelerates the resulting free electrons so that almost all the electrons travel past the grid and impact the phosphor coating on the anode, exciting the phosphor to emit light.

FIGS. 1 and 2 show the pixel control circuit 40 in each pixel 100 as including a field effect transistor 44 whose drain connects to all the emitter tips 20 in the pixel, whose gate receives the video signal 42, and whose source is connected to negative voltage node 48 (electrical ground in the illustrated embodiment) through a resistance 46. Within a given pixel 100a, the transistor 44a acts to regulate the total current through that pixel's emitter tips 20a–20d at a value approximately equal to the voltage of the video signal 42a divided by the value of the resistance 46a. This pixel control circuit and related alternative designs are described in detail in commonly-assigned U.S. Pat. No. 5,357,172 to Lee et at.; U.S. Pat. No. 5,387,844 to Browning; U.S. Pat. No. 5,410,218 to Hush; and U.S. Pat. No. 5,459,480 to Browning et al.; the entire contents of each of which are hereby incorporated into the present specification. Additional alternative pixel control circuits are described in commonly-assigned U.S. patent application Ser. No. 08/551,780 filed Nov. 7, 1995 by Glen E. Hush for "Field Emission Display With Binary Address Line Supplying Emission Current", the entire contents of which are hereby incorporated into the present specification.

The display as described up to this point of the specification is conventional, and any conventional structure and method of manufacture can be used to implement the features described above. For example, preferred methods of manufacturing the emitter tips and grid electrodes are described in commonly-assigned U.S. Pat. No. 5,151,061 to Sandhu; U.S. Pat. No. 5,186,670 to Doan et al.; U.S. Pat. No. 5,229,331 to Doan et al.; and U.S. Pat. No. 5,391,259 to Cathey et al.; the entire contents of each of which are hereby incorporated into the present specification. In addition, a preferred method of manufacturing the emitter tips and the transistors 44 is described in commonly-assigned U.S. patent application Ser. No. 08/554,551 filed Nov. 6, 1995 by John K. Lee for "A Cold Cathode Emitter and Method for Forming the Same", the entire contents of which are hereby incorporated into the present specification.

2. Problem Caused by Shorted Electrodes

The problem addressed by our invention is that a single shorted electrode pair can disable the entire pixel it belongs to, even if all the other electrodes in the pixel are good.

As stated earlier in the Background of the Invention, manufacturing defects typically result in a small number of field emitter tip electrodes 20 being short-circuited to their respective grid electrodes 22. For example, in the embodiment shown in FIG. 2, a dielectric layer 26 separates each grid electrode from the emitter tip 22 and the drain of transistor 44. Microscopic cracks or pinhole defects in the dielectric material 26 can cause a short circuit between an emitter tip and its corresponding grid electrode. Also, particulate contaminants can create a conductive bridge between an emitter tip and its corresponding grid electrode.

Referring to FIG. 1, all of the field emitter tips 20a–20d within a single pixel 100a are connected together, and all of the corresponding grid electrodes 22a–22d are connected together. In other words, all of the electrode pairs 20,22 within the pixel are connected in parallel. If one of the emitter tips (e.g., tip 20d) in that pixel is shorted to its corresponding grid electrode (e.g., 22d), the voltage across the shorted electrode pair (20d,22d) will be close to zero, thereby reducing close to zero the voltage across the remaining good electrode pairs (20a–20c,22a–22c) in that pixel. As a result, the voltage across the good electrode pairs will be much too low to initiate field emission. Consequently, no current will flow through the good emitter tips (20a–20c), and all the current supplied by the pixel control circuit 40a will flow through the shorted electrode pair (20d, 22d).

Therefore, one bad emitter tip in the pixel will disable field emission from the other emitter tips in the pixel, causing the entire pixel to be dark.

3. Inventive Method of Identifying or Disabling Shorted Electrodes

The method of the present invention is based on connecting a test voltage 32 or 34 between each field emitter tip 20 and its corresponding grid electrode 22. The test voltage must be low enough to avoid initiating field emission of electrons from whichever electrode is connected to the more negative voltage.

Since no field emission will occur in response to such low voltage, there will be no current flow through any good (i.e., non-defective) emitter tips. However, current will flow through any emitter tips which are short-circuited to their corresponding grid electrodes.

In one aspect of the present invention, a sensor detects the locations of the current flow in the display in order to identify which electrodes are short-circuited. After identification, the shorted pair of electrodes can be disabled by disconnecting one of the two shorted electrodes from its source of current flow, such as the pixel control circuit 40 or the grid voltage source 32. For example, an electrode can be disconnected by using a laser beam to vaporize a conductor which connects it to such electrical source.

In another aspect of the present invention, the test voltage produces a current flow groat enough to heat a portion of the current flow path to the point of vaporizing it or otherwise interrupting its electrical continuity, so that no further current can flow through the shorted electrodes. In one embodiment, the current flow vaporizes the shorted emitter tips. In another embodiment, the current flow vaporizes or breaks a fuse connected in series with either the emitter tips or the grid electrodes.

After the shorted electrodes are disabled by one of the preceding methods, the remaining electrodes connected to each pixel control circuit 40 will receive the full current output of the control circuit. Consequently, the total current flow to the emitter tips within a pixel can be independent of whether some of the emitter tips within that pixel have been disabled. Therefore, so long as only a small fraction of the emitter tips is shorted, the performance of the display can be completely unaffected by the disabled emitter tips.

Advantageously, the method of the invention can be performed either before or after the display is sealed and evacuated. There is no need to connect the anode power supply 30 while performing the method of the invention. In fact, in a display like the illustrated embodiment in which the grid electrodes and emitter tips are fabricated on a common substrate such as silicon substrate 14, the method of the invention can be performed before the substrate is mounted to the anode assembly 10, 12.

4. Resistive Heating Methods

As just stated, the method of the present invention begins by connecting a test voltage 32 or 34 between each field emitter tip 20 and its corresponding grid electrode 22, the test voltage being set low enough to avoid initiating field emission of electrons from whichever electrode is connected to the more negative voltage. If the grid voltage power supply 32 is adjustable, the required test voltage can be supplied by adjusting the grid voltage power supply to output a reduced voltage.

Alternatively, a power supply 34 in a test fixture can be connected to the display in place of the normal grid voltage power supply 32 for purposes of performing the method of the invention. Connecting the display to a test fixture is facilitated by the fact that, as stated above, the method of the invention can be performed before the display is sealed and evacuated, and even before the substrate 14 is mounted to the anode assembly 10,12.

In the present patent specification, the term "test voltage" shall mean the voltage supplied by the grid voltage power supply 32 or other test voltage power supply 34 while performing the method of the present invention, where such voltage is low enough to avoid field emission in the display.

For example, in one actual implementation of the invention, the normal output voltage of the grid voltage source 32 during operation of the display was +40 to +50 volts. To perform the method of the invention, we adjusted a test fixture power supply 34 to provide a test voltage of +10 volts between the grid electrodes and electrical ground, this voltage being low enough to ensure no field emission would occur.

Because the power supply 32 or 34 is adjusted to provide a voltage too low to initiate field emission, no current will flow between good electrode pairs 20,22, but current will flow between any electrode pairs which are shorted together. Current flow always generates heat. As described below, this heat can be used to identify, or even disable, the shorted electrodes.

To maximize current flow through the shorted electrodes, and to minimize power and heat dissipation in the pixel control circuits 40, the pixel control circuits 40 should be turned on (i.e., set to their minimum resistance state) by an appropriate input signal 42. However, in the pixel control circuits 40 shown in FIG. 1, the maximum current flow through each control circuit 40 is limited by the maximum saturation current of the field-effect transistor 44 and is further limited by the resistance of resistor 46. Accordingly, it may be desirable to include a bypass circuit (not shown) which connects the emitter tips 20 directly to the test voltage power supply 32 or 34, bypassing the pixel control circuits 40. Another method of bypassing the pixel control circuit by forward-biasing an isolation well is described below.

a. Heat Detection to Identify Shorted Electrodes

If the current flow is great enough, the shorted electrodes and/or the wiring connecting them to the power supply 32 or 34 will heat up enough to detect with a commonly available commercial sensor, such as an infrared microscope. Typically, the shorted electrodes will have higher resistance than the connecting wiring, so they will radiate more heat, and the location of each shorted electrode pair can be measured with an infrared microscope.

Once the location of each shorted electrode pair is known, each shorted electrode pair can be disconnected so that it no longer is in parallel with, and no longer diverts current from, the good electrodes within the same pixel.

FIG. 3 illustrates a display structure having removable links 50 which facilitate disconnecting grid electrodes 22 which are shorted to their corresponding emitter tips 20. The positive terminal of the grid voltage power supply 32 connects to bus conductors 52 which run across the entire active area of the display. Each grid electrode 22 connects to the bus 52 through a short conductor 50, referred to as a link. The grids 22, links 50, and busses 52 may be fabricated of any conductive material such as aluminum or doped polysilicon.

Suppose that, using the resistive heating method explained above, a particular electrode pair 20d,22d is identified as being short-circuited. The shorted grid electrode 22d can be disconnected from the grid voltage bus 52 by removing the link 50d between the grid 22d and the buss 52. Removing the link 50d disconnects the shorted grid electrode 22d from the other grids 22a–22c in the pixel and from the grid voltage power supply 32. Consequently, removing the link 50d prevents current flow through the shorted electrode pair 20d,22d and allows normal operation of the good electrodes 20a–20c,22a–22c in the pixel.

A link (e.g., 50d) connected to a shorted electrode pair readily can be removed by vaporizing it with a laser beam. Lasers commonly are used in liquid crystal displays, ASICs (application-specific integrated circuits), gate arrays, and wafer-scale integrated circuits to vaporize removable conductors to disconnect unwanted components from an integrated circuit. The types of lasers used for such purposes, the equipment for aiming the laser at a specific conductor to be removed, and the methods of fabricating removable conductors for such purposes are suitable for practicing the present invention. The measured location of each shorted electrode pair can be electronically transferred to the laser aiming apparatus from the instrument which performed the measurement, such as an infrared microscope as described above.

Preferably, the links 50 are fabricated to facilitate the vaporization of selected links by a laser beam. For example, the links should be as thin as practical in both depth and width.

It was stated earlier that the shorted electrodes typically have higher resistance, and therefore dissipate more heat, than their connecting wiring. Alternatively, the links 50 can be fabricated so thin in both depth and width (i.e., with a small enough cross section) that the resistance of each link 50 is much greater than the resistance through a typical shorted electrode pair 20,22. In that case, most of the heat generated in response to the test voltage 32 or 34 would radiate from the site of the links 50 which need to be removed.

Concentrating most of the heat dissipation at the links 50 rather than at the electrodes 20,22 would simplify the programming of the laser aiming apparatus, because the laser could be aimed exactly where the infrared sensor locates the source of heat. In contrast, in the original example in which the heat was radiated primarily from the shorted electrodes themselves rather than the links, the laser aiming apparatus would need to be programmed with a map or table indicating the location of each link to be removed as a function of the location of each shorted electrode detected by the infrared sensor.

FIGS. 1 and 3 illustrate two alternative methods of grouping the grid electrodes for connection to removable links 50. To illustrate the first alternative, pixel 100a is depicted as having a distinct removable link 50a–50d for each grid electrode 22a–22d. To illustrate the second alternative, pixel 100b is depicted as having groups or subsets of two grid electrodes connected to each removable link. Specifically, grid electrodes 22e and 22f connect to the grid voltage bus 52 through a single link 50e, and grid electrodes 22g and 22h connect to the bus 52 through another link 50g.

The pixel 100a implementation is preferable, because a shorted electrode pair can be disabled without affecting any other electrode pairs. In the second implementation illustrated in pixel 100b, if a single electrode pair (e.g., 20e, 22e) were shorted, disabling it by removing its corresponding link (50e) also would disable, undesirably, another good electrode pair (20f, 22f) connected to the same link (50e).

b. Fusible Links

In a modification of the method just described, rather than using heat dissipation in resistive links 50 to locate shorted electrodes, the heat can be used to remove or open-circuit the links, thereby eliminating the need for the infrared sensor and the laser. Specifically, when the test voltage 32 or 34 is connected between the emitter tips 20 and their respective grid electrodes 22, the resulting current through any electrode pairs 20,22 which are shorted can be high enough to remove (i.e., break the electrical continuity of) the links 50 connected to the shorted electrodes. In this method, the links 50 function as electrical fuses. The fusible links 50 can be removed by any mechanism which produces an electrical discontinuity or open circuit in response to resistive heating, such as vaporizing the material of the links, or cracking the links under thermal stress.

In larger displays having relatively high pixel current, it should be feasible to design the fusible links 50 so that they are removed (i.e., electrically open-circuited) when the test voltage 34 is applied across shorted electrodes, because the links normally conduct vanishingly small amounts of current. Specifically, during normal operation of the display, at least 99.99% of the electrons emitted from each field emitter tip 20 are accelerated past the adjacent grid electrode 22 so as to strike the anode 10. Consequently, the current flow through each grid electrode 22 and its respective link 50 is less than 0.01% of, or $10^{-4}$ times, the current through each emitter tip 20. If the test voltage produces through a shorted electrode pair the same current as the maximum pixel current provided by a pixel control circuit 40 during normal operation of the display, then this current through the corresponding link 50 will be $10^4$ to $10^7$ times greater than normal, depending on whether the number of emitter tips per pixel is just a few (as in the smallest displays) or a thousand (as in large displays).

Figure 5:
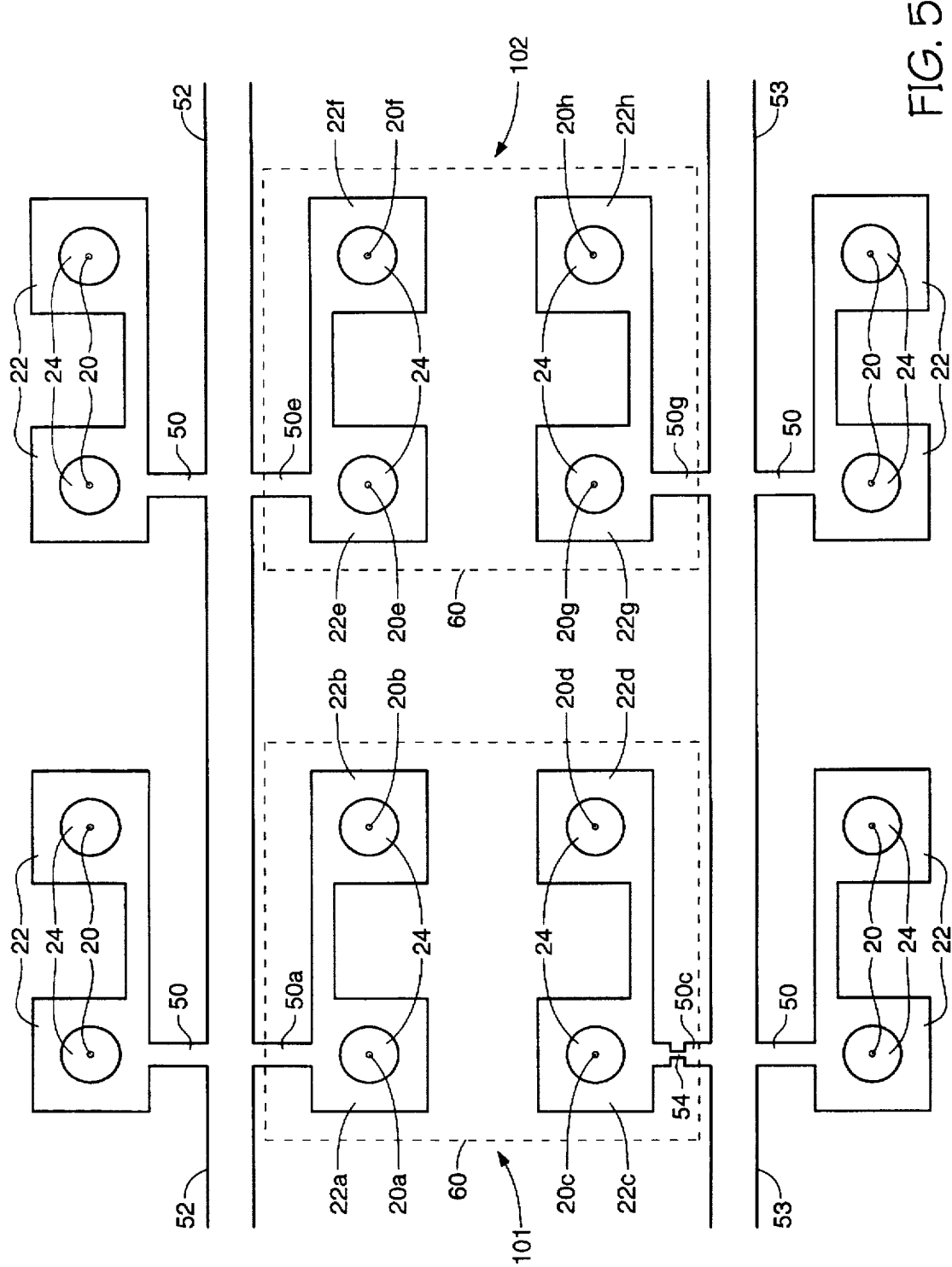
FIG. 5 is a top view of the grid electrodes of the display of FIG. 4.

The fusible links 50 can be fabricated extremely thin so as to open up (e.g., vaporize or crack) in response to the heat dissipated by a current flow $10^4$ to $10^7$ times higher than normal, but otherwise withstand the minuscule current they carry during normal display operation. It is especially preferable to concentrate the resistance of each fusible link 50 within a fusible portion 54 which occupies as small a volume as possible, so that the heat dissipated in the resistance will be concentrated in a small volume and thereby raise its temperature more rapidly. As shown in FIGS. 3 and 5, this can be accomplished by fabricating a short section 54 which is much narrower than the rest of the link 50.

In summary, when the test voltage 32 or 34 is connected between the emitter tips 20 and their respective grid electrodes 22, the resulting current through any electrode pairs 20,22 which are shorted will dissipate heat which removes (i.e., break the electrical continuity of) the links 50 connected to the shorted electrodes.

c. Increased Test Voltage of Reverse Polarity

For performing the method of the invention, a much higher test voltage can be connected between each emitter tip 20 and its corresponding grid electrode 22 if the polarity of the test voltage 34 is the reverse of the polarity of the grid voltage power supply 32 during normal operation of the display—in other words, if the positive and negative terminals of the test voltage power supply 34 are connected to the emitter tips and grid electrodes, respectively. FIG. 1 shows the test voltage source 34 connected with such polarity.

The reason reversing the polarity permits increasing the test voltage is that the voltage required to initiate field emission of electrons increases with the smoothness of the electrode connected to the more negative voltage. In a field emission display, the emitter tips are fabricated with sharp points to reduce as much as possible the voltage required to initiate field emission. However, the grid electrodes preferably have relatively smooth surfaces without sharp corners. Consequently, if the positive and negative terminals of the test voltage source 34 are connected to the emitter tips and grid electrodes, respectively, no field emission will occur unless the test voltage is much higher than the normal grid voltage provided by the grid voltage power supply 32 during normal display operation.

For example, in the preferred embodiment of FIGS. 1–3, where the normal grid voltage source 32 provides +40 to +50 volts to the grid electrodes, it was stated earlier that a test voltage of +10 volts could be connected between the grid electrodes and ground with assurance of avoiding field emission. In contrast, a reversed-polarity test voltage source 34 can provide −100 volts to the grid electrodes without causing field emission. (These voltages are merely illustrative. In practice, the voltage required for field emission is highly dependent on the sharpness of the emitter tips, the spacing between the emitter tips and the grid, and the degree of vacuum in the region between the electrodes.)

The advantage of increasing the test voltage is that it increases the heat dissipation in the shorted electrodes and their corresponding links 50 in proportion to the square of the voltage. Maximizing heat dissipation is especially important when the objective is to thermally remove the connection to the shorted electrodes, rather than to merely identify their locations.

d. Reverse Polarity Test Voltage to Bypass Pixel Control Circuit

If the display is fabricated according to the preferred structure shown in FIGS. 1 and 2, a reversed polarity test voltage permits markedly higher current flow through the shorted electrodes by bypassing the pixel control circuits 40.

The display is fabricated so that the only electrical barrier between the emitter tip electrodes 20 and the substrate 14 is a PN junction 62. Specifically, the substrate 14 is lightly P-doped, and the emitter tips 20 are fabricated on an N-doped region 60, called the emitter base, which directly overlies the P-doped substrate. A PN junction exists at the boundary 62 between the N-type emitter base region 60 and the P-type substrate region 14. The substrate 14 is connected to a voltage at or near electrical ground.

In normal operation of the display, the grid voltage source 32 maintains the emitter tips 20 positive with respect to ground and with respect to the substrate 14. Consequently, the PN junction 62 remains reverse-biased and has a very high impedance. This creates a high impedance (i.e., low leakage current) barrier between each emitter base 60 and the substrate, and consequently a high impedance barrier between adjacent emitter bases 60 belonging to different pixels.

A region, such as the emitter base 60, which is electrically insulated from the substrate 14 by a reverse-biased PN junction is conventionally termed an isolation well or isolation tank. Reverse-biased isolation wells or isolation tanks are conventionally used in a wide range of semiconductor applications for isolating circuits fabricated on a semiconductor substrate.

If a reversed polarity test voltage source 34 applies a negative voltage to the grid electrodes 22, any shorted emitter tips 20 will become more negative than the substrate 14, thereby forward-biasing their respective PN junctions 62. The forward-biased PN junction 62 provides a very low resistance path of current flow from the shorted emitter tips 20 to electrical ground, bypassing the comparatively high resistance of the pixel control circuit 40. This generally permits a much higher current flow through the shorted electrodes than in the previously described embodiments.

In many conventional field emission displays, the maximum current flow possible through the pixel control circuit 40 may be too low to remove a fusible link 50. In such cases, the present method of forward-biasing the isolation well junction 62 between the emitter tips 20 and the substrate 14 should permit more than enough current flow to remove a fusible link 50.

The preferred display apparatus shown in FIG. 2, in which only a reverse-biased PN junction isolates the emitter tips from the substrate, has the following structure. The single-crystal silicon substrate 14 is lightly P-doped. In each pixel, the emitter tips 20 extend upward from with a conductive, N-doped emitter base region 60 at the surface of the substrate. The N-doped emitter base region 60 is contiguous with the N-doped drain 41 of the N-channel field effect transistor 44. Another N-doped region 43 constitutes the transistor source. A heavily P-doped region 68 is formed between each pixel for electrical isolation. The transistor gate 45 is polysilicon deposited over a thin gate oxide and N-doped. An oxide dielectric layer 26 overlies all these features on the substrate 14, except for openings 24 in the oxide surrounding each emitter tip 20. The grid electrodes 22 and links 50 are polysilicon deposited over the oxide 26 and N-doped. The grid voltage busses 52 are either polysilicon or aluminum. A silicon nitride layer 27 overlies and encapsulates these features.

More details of the processes for fabricating the emitter tips are disclosed in commonly-assigned U.S. Pat. No. 5,151,061 to Sandhu; U.S. Pat. No. 5,186,670 to Doan et at.; U.S. Pat. No. 5,229,331 to Doan et at.; and U.S. Pat. No. 5,391,259 to Cathey et al. The remaining structural features are fabricated by conventional semiconductor fabrication processes. Our currently preferred process for fabricating the emitter tips and transistor drain as a single, contiguous, N-doped region as described above is disclosed in greater detail in commonly-assigned U.S. patent application Ser. No. 08/554,551 filed Nov. 6, 1995 by John K. Lee for "A Cold Cathode Emitter and Method for Forming the Same". The entire contents of each of these patents and patent applications are hereby incorporated into the present patent specification.

e. Vaporizing Shorted Emitter Tips

We have discovered that if the test voltage 32 or 34 produces a high enough current through the shorted emitter tips, the shorted emitter tips will be vaporized, thereby eliminating any current flow through the shorted electrodes. We have found that a particularly effective method of obtaining a sufficiently high current is the previously described method of applying a reverse polarity test voltage 34 so as to forward bias the PN junction 62 isolating the shorted emitter tips from the substrate.

In this method of vaporizing shorted emitter tips, the links 50 preferably should not be fusible, because the heat dissipated by the current flow should be concentrated as much as possible in the shorted electrodes, rather than in the links. Therefore, in this method the links 50 connecting the grid electrodes 22 to the grid voltage bus 52 preferably should not be extremely thin as in the fusible link method; instead, the links preferably should be thick and wide enough so their resistance is much less than that of the shorted electrodes. We have found that the resistance of the shorted electrodes varies widely, depending on the cause of the short, from as little as 100 ohms to as much as one Gigohm. Ideally, then, the resistance of each link 50 should be 10 ohms or less. However, if enough heat is dissipated in a link 50 so that it is thermally damaged before the shorted electrodes are vaporized, the desired result of preventing current flow through the shorted electrodes will still be achieved.

We have found that with a negative test voltage 34 connected to the grid electrodes, the resistance of the forward-biased isolation junction 62 is much less than the resistance of any shorted electrodes, so that most of the heat dissipated by the current flow is concentrated in the shorted emitter and grid electrodes. For example, applying a test voltage of −50 volts between the grid bus 52 and the electrically grounded substrate 14, we measured an instantaneous current of 1 ma through a single shorted emitter tip. In less than one second, the resulting heat vaporized the shorted emitter tip, after which the current dropped to zero.

An obstacle to implementing this method is that the shorted electrodes can vaporize explosively, throwing off material with sufficient energy to damage adjacent components of the display. Such explosive ejection of material can be avoided by limiting the total energy supplied by the test voltage source 34. For example, in one embodiment the test voltage source 34 is a capacitor which stores an amount of electrical charge large enough to vaporize a small number of shorted emitter tips (perhaps just two or three shorted tips), but low enough to prevent explosive ejection of the vaporized material.

Unfortunately, as mentioned above, the resistance of the shorted electrodes can vary tremendously (from $10^2$ to $10^9$ ohms), depending on the type of defect which caused the short. Different display manufacturing processes will tend to produce different kinds of defects. A single value of capacitance would not provide the optimum thermal energy to the shorted electrodes if such a wide range of resistances (ranging by a factor of $10^7$) were encountered in a given manufacturing process. Accordingly, in our currently preferred embodiment of the test voltage source 34, we initially charge up a small capacitor, about 1000 pf, to −50 or −100 volts, and then connect it between the grid bus and the substrate. If the resulting current pulse is insufficient to open-circuit the shorted electrodes, we repeat the process with progressively larger capacitors, up to about 1 µf.

Although a voltage source of 100 volts or less can supply very little power to a shorted electrode pair whose resistance is at the higher end of the above-mentioned range, the dissipated thermal energy usually is sufficient to vaporize the short. High resistance shorts usually are caused by very small particles or defects which require little thermal energy to destroy, in contrast with low resistance shorts which usually are caused by larger, more massive particles requiring much more thermal energy to vaporize or disrupt.

Instead of charging up a capacitor, another alternative embodiment of the test voltage power supply 34 would supply a pulse of electrical power which shuts off after a predetermined total electrical energy had been supplied. In other words, the test voltage power supply 34 would output a voltage pulse whose duration was inversely proportional to the current flow to the display, so that the total electrical energy in the pulse (voltage×current×time) is always a predetermined optimum value. In one suitable design, the power supply 34 would include a current sensor and a high speed switch which terminates the output pulse at a time inversely proportional to the current measured by the current sensor.

If the display has some shorted electrodes having low resistance and other shorted electrodes having high resistance, the methods which limit the total energy supplied by the test voltage source 34 are likely to vaporize the low resistance shorts while leaving the high resistance shorts intact. Therefore, it may be necessary for the test voltage source to repeat the process of discharging the capacitance or supplying a pulse to the display. The test voltage source 34 could be programmed to pause for a time period sufficient for the display to cool, then repeat the application of the capacitor discharge or pulse, this cycle being repeated periodically until the test voltage ceased to produce current flow, thereby indicating that all shorted electrodes had been removed.

In a conventional passive matrix display, instead of connecting the test voltage source 34 across all the electrode pairs 20,22 simultaneously, the test voltage source can be connected across only one pixel (or a few pixels) at a time by connecting the test voltage source between one (or a few) row conductor line(s) and one (or a few) column conductor line(s). The advantage of testing only one or a few pixels at a time is that it reduces the number of shorted electrodes likely to be in the current path at one time, so that the thermal energy from the test voltage source can be concentrated in a small number of shorted electrodes.

Figure 4:
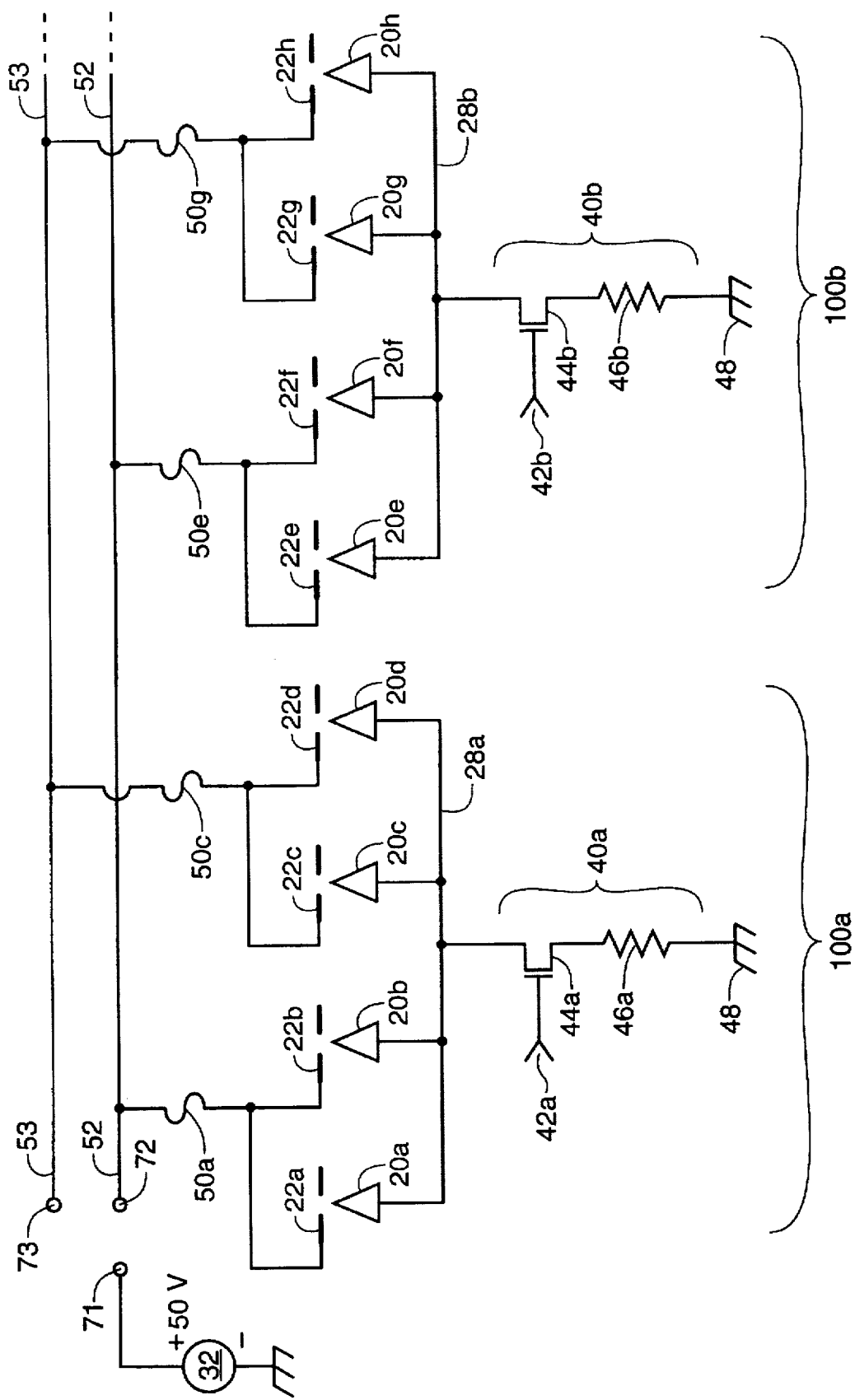
FIG. 4 is an electrical schematic diagram of two pixels of a display having two grid busses connected to each pixel and two removable links per pixel.

5. Methods of Identifying Shorted Electrodes with Current Measurement and Multiple Busses FIGS. 4 and 5 show a different display design which is adaptable to an advantageous method of identifying shorted grid and emitter electrodes. This identification method, unlike the previously described methods, does not require generating detectable heat.

In contrast to the previously described display designs, the display shown in FIGS. 4 and 5 has two separate grid voltage busses 52 and 53. Additionally, the grid electrodes 22 within each pixel 100 are divided between two groups, with the first group of grid electrodes in each pixel connected to the first bus 52 through a first removable link 50, and the second group connected to the second bus 53 through a second removable link 50. The number of removable links in the entire display equals the number of grid voltage busses (two in the illustrated embodiment) multiplied by the number of pixels in the display.

For example, in the embodiment shown in FIGS. 4 and 5, pixel 100a has four emitter tip electrodes 20a–d and four corresponding grid electrodes 22a–d. The first group of two grid electrodes 22a, 22b in pixel 100a are connected to the first grid voltage bus 52 through a first removable link 50a. The second group of two grid electrodes 22c, 22d in pixel 101 are connected to the second grid voltage bus 53 through a second removable link 50c.

All four emitter tips 20a–d in the pixel 101 are connected to electrical ground through the pixel control circuit 40 previously described with reference to the FIG. 1 embodiment. The normal operation of the display is the same as the previously described operation of the display shown in FIG. 1. The grid voltage power supply 32 is the same as in the FIG. 1 display, and its positive terminal 71 is connected both to terminal 72 of grid voltage bus 52 and to terminal 73 of grid voltage bus 53. Consequently, the display circuitry during operation of the present embodiment is the same as the circuitry of the FIG. 1 embodiment, except for the location and number of removable links 50.

During testing of a newly manufactured display, the output voltage of the grid voltage power supply 32 is reduced to a test voltage value which is less than the voltage required to start field emission from a good (not short-circuited) emitter tip electrode 20. Since the test voltage is too low to start field emission, no current will flow through the good emitter tips, and any current flow will be through shorted emitter and grid electrodes.

To identify which pixels contain the shorted electrodes, the video signal lines 42 are set to turn on each pixel control circuit 40 in the display only one at a time, stepping through every pixel in the display. As each successive pixel is turned on, the current flow from the power supply 32 is measured. For each successive pixel, the current will be negligible if all the emitter and grid electrodes in that pixel are good, and substantial current will be measured if the pixel contains any emitter-to-grid shorts.

If a pixel is indicated as having a short by conducting substantial current, then the power supply 32 is disconnected from the second grid bus 53, leaving it connected only to the first grid bus 52, and the pixel control circuit for that pixel is turned on again.

If the current drops to zero, then the short in that pixel must be in the second group of the emitter and grid electrodes (connected to the second bus 53), rather than in any of the electrodes in the first group (connected to the first bus 52). Accordingly, an entry is stored in a computer memory device (not shown) to record that a short exists in the second group of electrodes in that pixel.

If the current does not drop to zero, then there is a short in the first group of emitter and grid electrodes (connected to the first bus 52). Accordingly, an entry is stored in the computer memory device to record that a short exists in the first group of electrodes in that pixel. To determine whether there also is a short in the second group of electrodes (connected to the second bus 53, the power supply 32 is disconnected from the first grid bus 52 and connected to the second bus 73, and the pixel control circuit for that pixel is turned on again. If the current drops to zero, then the second group of electrodes in that pixel is good. If current flow continues, then both the first and second groups of electrodes in that pixel have emitter-to-grid shorts, and an entry to that effect is stored in the memory device.

The just described process of sequentially turning on each pixel and recording a list of shorted electrode groups can be implemented readily by a computer instrumentation controller, using straightforward programming techniques.

After each of the pixels in the display is tested as just described, the memory device will contain a list identifying each of the electrode groups in the display having at least one emitter-to-grid short. This list then can be electronically transferred to an apparatus which removes the links connected the identified electrode groups. A suitable apparatus would be a laser as described earlier. The laser should be computer-controlled and should be programmed with a list of coordinate locations for the removable link connected to each electrode group, so that the laser can be aimed at the correct links based on the list of bad electrodes transferred from the memory device.

Instead of testing each pixel individually and sequentially as just described, the test process can be accelerated by employing any well known sifting or sorting algorithm wherein groups of pixels are tested simultaneously, and subsets of pixels within each group are separately tested only if the containing group is found to include a short circuit.

We claim:

1. For use in a field emission display, a method of disabling current flow between any field emitter tips and grid electrodes which are short-circuited, comprising the steps of:

(a) providing a field emission display, including the sub-steps of (i) providing a plurality of field emitter tips and grid electrodes, (ii) mounting each emitter tip adjacent an aperture of a corresponding one of the grid electrodes, (iii) connecting each emitter tip to an emitter coupling circuit for coupling the emitter tip to a negative operating voltage terminal, and (iv) connecting each grid electrode to a grid coupling circuit for coupling the grid electrode to a positive operating voltage terminal; and (b) for each emitter tip, when an operating voltage is not being applied between the negative and positive operating voltage terminals, applying a test voltage between a first point and a second point corresponding to that tip, the first point being within the emitter coupling circuit connected to that tip, the second point being within the grid power coupling circuit connected to the grid electrode corresponding to that tip, and the test voltage having a magnitude low enough to prevent field emission from the emitter tip and its corresponding grid electrode;

(c) wherein, for each emitter tip which is short circuited to its corresponding grid electrode, during the test voltage applying step, the test voltage produces a current flow through a path from the first point, through the emitter tip, through the corresponding grid electrode, and to the second point, the current flow being high enough to produce sufficient heat to damage a portion of said path so as to produce an open circuit in said path and thereby prevent further current flow to that emitter tip.

2. A method according to claim 1, wherein the current flow is high enough to vaporize any field emitter tips which are short-circuited to their respective corresponding grid electrodes.

3. A method according to claim 1, wherein:

the display providing step further comprises providing a plurality of removable links within the field emission display, each link being included within one of the coupling circuits; and in the voltage applying step, for each emitter tip which is short circuited to its corresponding grid electrode, the vaporized portion of said path includes at least a portion of one of the removable links.

4. A method according to claim 3, wherein:

the display is characterized by a plurality of pixels, wherein each pixel includes a number of said emitter tips, a number of said grid electrodes, and a number of said removable links; and the display providing step further comprises for each pixel, connecting each grid coupling circuit of that pixel to a distinct subset of the grid electrodes of that pixel; and including at least one of the removable links within each grid coupling circuit;

whereby, within each pixel, one removable link can be vaporized during the voltage applying step to disable current flow to one subset of the emitter tips within the pixel while enabling current flow to another subset of emitter tips within the pixel, whereby a short-circuited emitter tip can be disabled without disabling the entire pixel containing the bad tip.

5. A method according to claim 4, wherein:

the display providing step further comprises the step of, for each pixel, providing a single emitter coupling circuit, and connecting the emitter coupling circuit of that pixel to all the emitter tips of that pixel; and for each pixel, the emitter coupling circuit receives a video signal and provides to the emitter tips of the pixel a total current which is controlled by the video signal and which is substantially independent of the number of emitter tips connected to the pixel;

whereby the total current provided to the emitter tips in a pixel is substantially independent of whether a subset of the emitter tips in that pixel have been disabled by the vaporization of a removable link.

6. A method according to claim 3, wherein each removable link is included within one of the emitter coupling circuits.

7. A method according to claim 1, wherein:

during the test voltage applying step, the test voltage is a D.C. voltage and is applied between the first and second points with a polarity such that the first point is positive relative to the second point, whereby each emitter tip is positive relative to its corresponding grid electrode.

8. A method according to claim 7, wherein:

(a) the step of providing a field emission display further comprises providing each of said emitter tips within a respective N-type semiconductor region which adjoins a P-type semiconductor substrate at a respective PN junction boundary; and (b) the step of applying a test voltage further comprises electrically connecting each of said second points to the P-type substrate;

(c) whereby the test voltage forward biases the respective PN junction of each short-circuited emitter tip.

9. A method according to claim 1, further comprising the subsequent step of:

applying an operating voltage between the negative and positive operating voltage terminals, the operating voltage having a magnitude sufficient to permit field emission between a field emitter tip and its corresponding grid electrode.

10. A method according to claim 1, wherein the test voltage during the test voltage applying step has a polarity which produces a positive current flow from a short circuited emitter tip to its corresponding grid electrode.

11. A method according to claim 1, wherein the test voltage during the test voltage applying step has a polarity which produces a negative current flow from a short circuited emitter tip to its corresponding grid electrode.

12. For use in a field emission display, a method of identifying field emitter tip electrodes which are short-circuited to their corresponding grid electrodes, comprising the steps of:

(a) providing a field emission display having a plurality of field emitter tip electrodes and grid electrodes;

(b) applying between the emitter tip electrodes and the grid electrodes a test voltage whose magnitude is low enough to avoid producing field emission from any of the electrodes; and (c) detecting the location within the display of any heat radiation from any current flow produced by the test voltage;

(d) whereby the location of any heat radiation identifies any short-circuited electrodes.

13. A method according to claim 12, wherein the detecting step comprises measuring said locations with an infrared microscope.

14. A method according to claim 12, further comprising the subsequent step of:

disrupting said current flow to each short-circuited electrode by removing electrically conductive links connected to said short-circuited electrodes.

15. A method according to claim 14, wherein the disrupting step comprises damaging said conductive links with a laser beam.

16. For use in a field emission display, a method of identifying field emitter tips which are not short-circuited to their corresponding grid electrodes, comprising the steps of:
(a) providing a field emission display, including the sub-steps of
  (i) providing a plurality of field emitter tips and grid electrodes, and
  (ii) mounting each emitter tip adjacent an aperture of a corresponding one of the grid electrodes,
(b) providing a test voltage between first and second test voltage terminals; and
(c) for each one of a plurality of different subsets of emitter tips,
  (i) connecting the first test voltage terminal to the emitter tips in that subset,
  (ii) connecting the second test voltage terminal to the grid electrodes corresponding to the emitter tips in that subset, and
  (iii) detecting whether the test voltage produces a current flow,
(d) wherein the test voltage is low enough to avoid field emission from any of the emitter tips;
(e) whereby each subset of emitter tips can be identified as containing or not containing any short-circuited emitter tips according to whether or not said current flow is detected for that subset.

17. The method according to claim 16, further comprising the steps of:
connecting each emitter tip to an emitter coupling circuit for coupling the emitter tip to a negative operating voltage terminal;
connecting each grid electrode to a grid coupling circuit for coupling the grid to a positive operating voltage terminal;
providing a plurality of removable links within the field emission display, each link being included within one of the coupling circuits; and
for each subset of emitter tips for which current flow was detected during the detecting step, removing at least one of the removable links so as to disable current flow through said subset of emitter tips.

18. The method according to claim 17, further comprising the steps of:
(a) dividing the grid electrodes in each pixel into N subsets, wherein N is an integer greater than or equal to two;
(b) providing N buss conductors connected to the second test voltage terminal, wherein N is said number of grid subsets;
(c) providing N removable links for each pixel, so that the number of removable links in the display equals the number of pixels in the display multiplied by N, wherein N is said number of grid subsets; and
(d) for each integer k from 1 to N, connecting the k-th removable link in each pixel between the k-th bus and the grid electrodes in the k-th grid subset of that pixel.

19. A field emission display comprising:
a voltage source for providing a voltage across a positive terminal and a negative terminal;
a first number of grid electrodes, each grid electrode having a number of apertures;
a plurality of emitter tip electrodes, each tip electrode being an electrode having a sharp tip positioned adjacent one of the grid apertures;
a second number of grid coupling circuits, wherein each grid coupling circuit connects at least one of the grid electrodes to the positive terminal of the voltage source; and
a third number of emitter coupling circuits, wherein each emitter coupling circuit connects at least one of the emitter tip electrodes to the negative terminal of the voltage source;
wherein a plurality of said coupling circuits each includes a removable link which, according to whether the link is or is not removed, respectively disables or enable current flow between the voltage source terminal and the at least one electrode between which that coupling circuit is connected;
whereby selected links can be removed to disable current flow through selected emitter tips.

20. A display according to claim 19, wherein:
the display is characterized by a plurality of pixels, wherein each pixel includes a plurality of said emitter tips and a plurality of said removable links;
whereby, within each pixel, at least one link can be removed without disabling all the emitter tips in that pixel.

21. A field emission display according to claim 19, further comprising:
a plurality of pixels, each pixel including a plurality of grid electrode subsets, wherein each subset includes a number of said grid electrodes and the emitter tips adjacent thereto, and wherein the number of subsets is an integer N greater than or equal to two;
N bus conductors connected to the positive terminal of the voltage source, wherein N is said number of subsets; and
N removable links for each pixel, so that the number of removable links in the display equals the number of pixels in the display multiplied by N, wherein N is said number of subsets;
wherein, for each integer k from 1 to N, the k-th removable link in each pixel is connected between the k-th bus and the grid electrodes in the k-th grid subset of that pixel, wherein N is said number of subsets.

22. A field emission display according to claim 19, further comprising:
first and second bus conductors connected to the positive terminal of the voltage source; and
a plurality of pixels, each pixel including
  first and second grid electrode subsets, wherein each subset includes a number of said grid electrodes and the emitter tips adjacent thereto,
  a first removable link connected between said first bus conductor and the grid electrodes in the first grid electrode subset of that pixel, and
  a second removable link connected between said second bus conductor and the grid electrodes in the second grid electrode subset of that pixel.

23. A field emission display according to claim 19, wherein each removable link is within one of the emitter coupling circuits, so that removing one of the removable links disables current flow between the negative voltage source terminal and said at least one emitter tip electrode connected to the emitter coupling circuit which includes said one removable link.

24. A field emission display according to claim 23, wherein each removable link is a fuse connected in series between the negative voltage source terminal and said at least one emitter tip electrode connected to the emitter coupling circuit which includes said one removable link.

* * * * *